May 1, 1923.
C. F. MEIER
DRIVE CHAIN
Filed Dec. 23, 1921
1,453,592
2 Sheets-Sheet 1
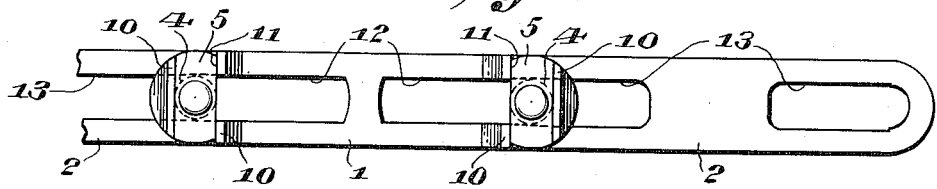
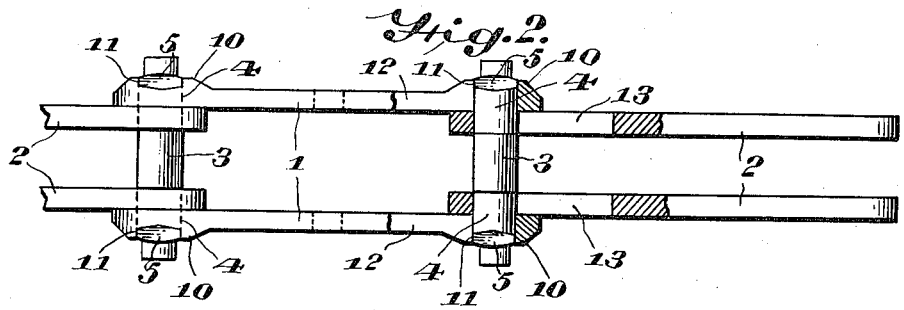
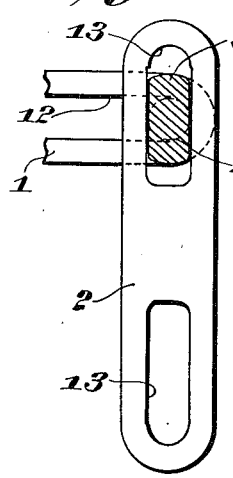
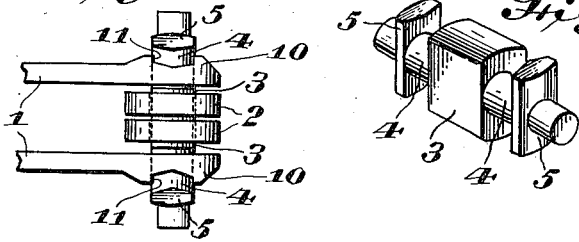
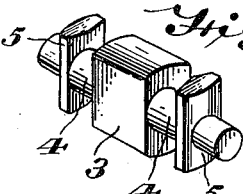
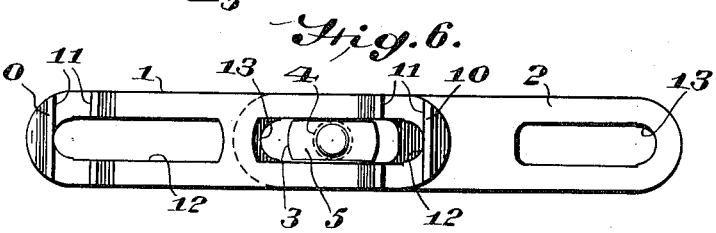
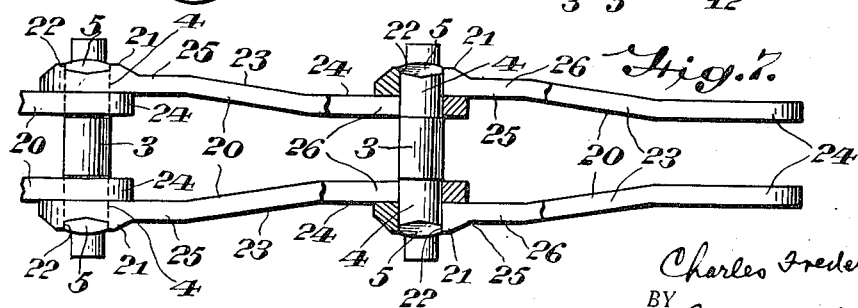
INVENTOR.
Charles Frederick Meier
BY Cyrus W. Anderson
ATTORNEY.

May 1, 1923.  1,453,592
C. F. MEIER
DRIVE CHAIN
Filed Dec. 23, 1921  2 Sheets-Sheet 2
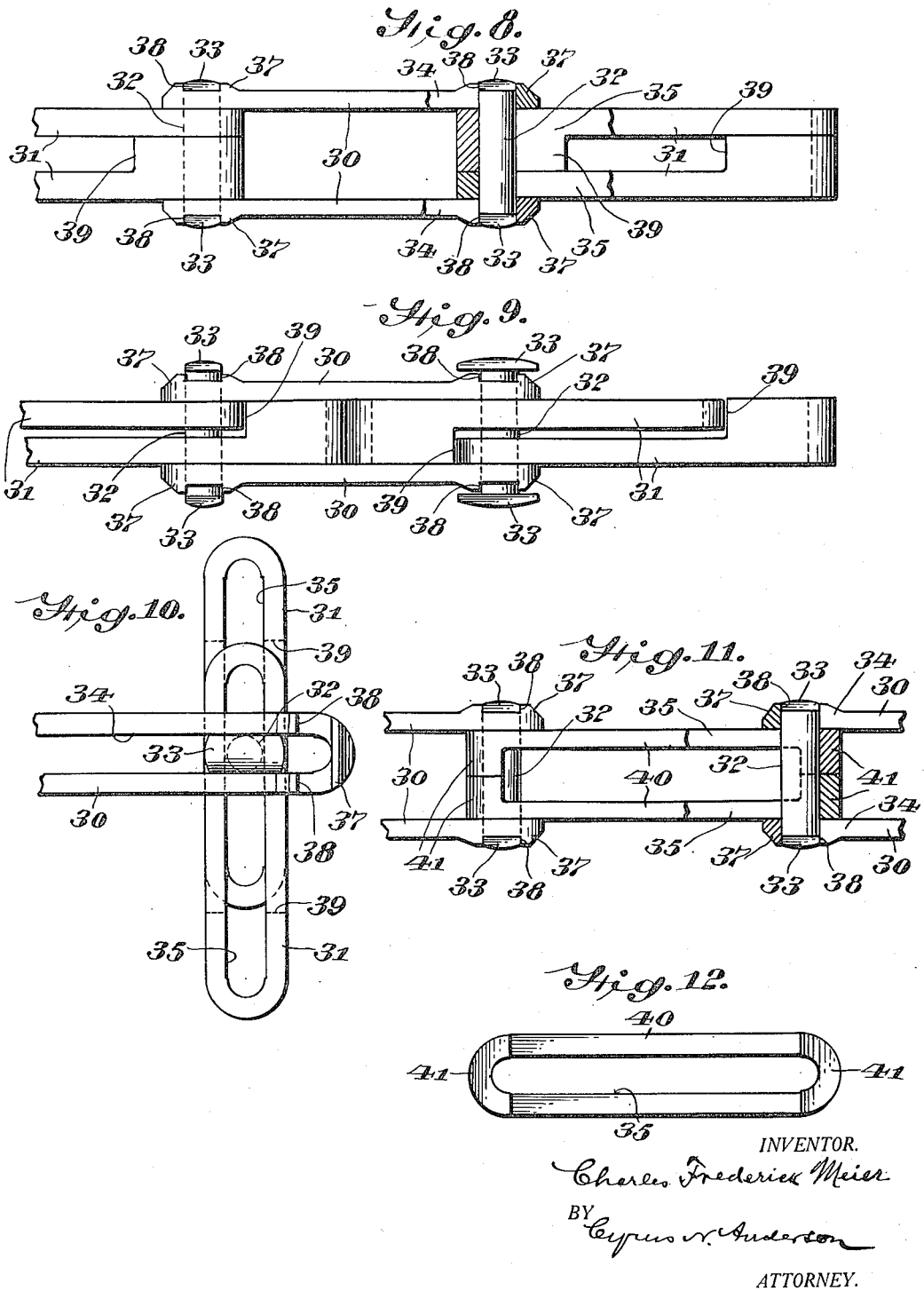

Patented May 1, 1923.

1,453,592

UNITED STATES PATENT OFFICE.

CHARLES FREDERICK MEIER, OF WHITE HAVEN, PENNSYLVANIA, ASSIGNOR TO WILMOT ENGINEERING COMPANY, OF HAZLETON, PENNSYLVANIA, A CORPORATION OF PENNSYLVANIA.

DRIVE CHAIN.

Application filed December 23, 1921. Serial No. 524,347.

*To all whom it may concern:*

Be it known that I, CHARLES FREDERICK MEIER, a citizen of the United States, and a resident of White Haven, in the county of Luzerne and State of Pennsylvania, have invented an Improvement in Drive Chains, of which the following is a specification.

My invention relates to drive chains which are adapted for use in heavy duty work, and it has for one of its objects to provide an improvement in the means whereby the members of the respective links may be collapsed or moved toward each other and adjusted at angles with respect to each other to effect removal of the pintle or pivot connecting adjacent overlapping ends of the said links to thereby effect disconnection of the ends of adjacent links.

Other objects and advantages of the invention will be pointed out in the detailed description thereof which follows or will be apparent from such description.

In order that the invention may be readily understood and its practical advantages fully appreciated reference may be had to the accompanying drawing in which certain forms of mechanical embodiment of the invention are shown.

In the drawings:

Fig. 1 is a side elevation of a portion of chain embodying the invention;

Fig. 2 is view partly in top plan and partly in horizontal section of the portion of chain shown in Fig. 1;

Fig. 3 is a view showing the central portion of a pivot employed in a chain structure in section and also showing members of the respective adjacent links in side elevation and arranged substantially at right angles with respect to each other;

Fig. 4 is a top plan view of the end portion of a link and of the end of an adjacent link, the said links being adjusted to positions substantially at right angles to each other;

Fig. 5 is a perspective view of the pivot employed for connecting the ends of adjacent links;

Fig. 6 is a view in side elevation of a pair of adjacent links in alinement and in telescoped adjusted relation with respect to each other;

Fig. 7 is a view of a portion of chain partly in top plan and partly in horizontal section, showing a slight modification of the structure;

Fig. 8 is a view partly in top plan and partly in horizontal section of still another modified construction;

Fig. 9 is a top plan view of the portion of chain shown in Fig. 8, showing the links in different relative position with respect to each other;

Fig. 10 is a view showing adjacent links of the chain structure in substantially right angular position with respect to each other into which position they are adjusted in the process of disconnecting adjacent ends of links;

Fig. 11 is a view partly in top plan and partly in horizontal section showing another modified construction; and Fig. 12 is a view in elevation of the inside of one of the side members of one of the links shown in Fig. 11.

Referring to Figs. 1 to 6 of the drawings: 1 and 2 designate alternate links of the chain structure, the adjacent overlapped ends of which are pivotally connected together by the pintle or pivot which comprises the intermediate or central relatively wide flat portion 3, the oppositely projecting pivot or trunnion portions 4 and the heads 5 upon the outer ends of the trunnion portions 4. Each of the side members of the link 1 is provided with outwardly extending raised or projecting portions 10 at its opposite ends, each of which is provided with a vertical notch, as indicated at 11, in which notches the heads 5 lie or are seated when the links of chain are connected together, as indicated in Figs. 1 and 2. Each of the side members of the link 1 is provided with horizontal slots 12 at their opposite ends. If desired these slots may be continuous throughout the length of the side members. The opposite side members of the links 2 are provided with slots 13 adjacent their opposite ends. The trunnion or pivot portions 4 of the pivot member extend through the slots 13 and 12, as is clearly indicated, and the outer ends of the said slots bear against or upon the said portions 4. It will be observed that when the chain is in extended position, as indicated in Figs. 1 to 6, the heads 5 and the portion 3 of the pivot (the said portion 3 being oblong in transverse section) extend in a direction or in a plane substantially at right angles to the portion of the chain within which the said pivot is situated.

The bottoms of the notches 11 are beveled and inclined inwardly and the inner sides of the opposite ends of the heads 5 upon opposite sides of the pivot or trunnion portions 4 of the pintle are correspondingly shaped so that when the chain links are connected together and the pivot is in proper position for connecting the adjacent overlapping ends the said heads are properly seated and adjusted within the notches 11.

The construction shown in Fig. 7 is similar in principle to that shown in the preceding figures of the drawings but differ in details therefrom. In said Fig. 7 the pintle or pivot member, comprising the parts 3, 4 and 5, is identical with the pivot or pintle member shown in Fig. 5.

The links, however, are of somewhat different construction. In the said figure each of the links 20 comprises opposite side members as shown. Each of the said side members is provided at one end with an outwardly raised projecting portion 21 having a vertical notch 22 therein and each side member is provided with an inwardly inclined portion at 23 and parallel portions 24, the latter being situated closer together than the opposite end portions of the said side members. These portions 24 engage the inner portions or inner ends of the trunnion or pivot portions 4 of the pivots and rest against the opposite ends of the intermediate relatively flat portion 3. These portions 24 are situated inside of the overlying or overlapping adjacent end portions of the opposite sides of the next successive link. The adjacent end portions 25 of the opposite side portions of the next adjacent or successive link are situated upon the outer side of the portions 24 and are in engagement with the outer portions of the trunnion or pivot parts 4 of the pintle which extend through the slots 26 in such portions. The heads 5 are seated in the notches 22 as indicated. It will be noted that the differences between the construction shown in Fig. 7 and the construction shown in the previous figures of the drawing reside principally in the fact that each of the links is identical in construction and that each is provided adjacent one end upon the outer side thereof with an outwardly extending raised or projecting portion and that the opposite ends of the said links are flat and that said opposite ends are situated inside of the overlapping ends of the opposite sides of the next adjacent link.

In both forms of construction the adjacent ends of any pair of links are disconnected in the same manner. Disconnection is effected by adjusting adjacent links into positions substantially at right angles to each other as shown in Fig. 3 and thereafter moving the ends of the side members of one of the links inwardly upon the central relatively flat portion 3. Thereafter the ends of the side members having the projections and notches thereon are moved inwardly so as to permit or cause the pintle to be turned or adjusted into the position as shown in Fig. 6 of the drawings, in which position the said pintle lies in the plane of the chain and also within the plane of the slots in the adjacent overlying end portions of the opposite side members of the links. When in this position and when the adjacent links are collapsed or shortened the pintle may be removed by moving the same laterally in either direction with respect to each other.

In the construction as shown in Figs. 1 to 6 inclusive the links 1 and 2 are arranged alternately with respect to each other.

In the construction as shown in Figs. 8 to 10 inclusive the chain comprises the links 30 and 31 arranged in alternate relation with respect to each other. These links are pivotally connected together by the cylindrical pintles 32 which are provided with oblong heads 33 at their opposite ends. These pintles extend through openings or slots 34 and 35 which are situated adjacent the opposite ends of each of the side members of the respective links 30 and 31.

The side members of the links 30 are each provided adjacent their opposite ends and upon their outer sides with raised or projecting portions 37 each of which is provided with a vertical notch 38 in which the heads 33 of the pintles are seated when the links of the chain are in connected relation to each other. The inner surfaces of each of the side members of the links 30 are flat, as indicated, and the opposite ends thereof overlie or overlap the outer sides of the adjacent end of the two alternate or oppositely disposed links 31.

Referring now to the links 31 it will be noted that each side member thereof is thickened or in the form of a head, which thickening is effected by providing an inwardly projecting portion 39. The remaining portion of each of the said side members is relatively thin. The inner surface of each of the said projections is adapted to rest against the inner surface of the adjacent relatively thin portion of the opposing side member. When it is desired to separate or disconnect the ends of adjacent links the side members of the link 31 are adjusted with relation to each other into the positions indicated in Fig. 9 of the drawings. Thereafter the said link 31 is turned into the position indicated in Fig. 10 and moved into a position a distance within the end of the adjacent link 30. In the meantime the adjacent ends of the side members 30 of the adjacent link are moved inwardly so as to disengage the heads 33 from the notches 38 which permits the pintle 32 to be turned into positions such that the pintle may be removed by withdrawing either one of the heads through the slots 34 and 35.

In the construction shown in Figs. 11 and 12 the opposite side members of the links 30 are identical with the corresponding links shown in Figs. 8 to 10 inclusive, but the alternate links 40 are of somewhat different construction. In this form of construction the pintle or pivot pin 32 also is identical with the pintle or pivot pin correspondingly numbered in Figs. 8 to 10.

Each of the side members of the link 40 is provided at its opposite ends and upon its inner sides with projections 41, the inner ends of which projections, when the links of chain are in extended relation with respect to each other as is shown in Fig. 11, are in contact with each other.

When it is desired to disconnect the adjacent ends of any two links, such disconnection may be effected by moving the opposite side members of the link 40 longitudinally in opposite directions with respect to each other so as to move the said projections 41 out of registry with respect to each other. This permits the collapsing or the moving toward each other of these opposite side members which in turn permits the collapsing or moving toward each other of the overlapping ends of the opposite side members 30. After this has been accomplished in the manner as indicated in connection with Figs. 8 to 10 of the drawings the pintle 32 may be turned into position so as to bring the head 33 thereof into alinement with the slots through the opposite side members of the links 30 and 40.

It will be seen that I have provided a chain of the character indicated which is strong and capable of withstanding hard and heavy usage and that when desired the adjacent ends of adjacent links may be readily disconnected.

Having thus described my invention, what I claim and desire to secure by Letters Patent is:

1. A chain comprising links, each of which consists of oppositely disposed side members, the opposite ends of the side members of alternate links overlapping the adjacent ends of the side members of adjacent links, and the side members of each of the said links having elongated slots in their opposite ends, which slots extend longitudinally of said members and a pintle for connecting adjacent overlapping ends of the said links, the said pintles each consisting of a central portion oblong in cross section, said portion being of greater width than the width of the said slots, and pivot portions projecting from the opposite ends of said central portion, and means upon the outer ends of said pivot portions for retaining the links thereon, adjacent links of said chain being adapted to be turned to positions at right angles with respect to each other after which they may be moved inwardly toward each other and the said links after such latter movement being adapted to be moved into alinement with each other to cause movement of the pintle into position to permit removal of the links therefrom.

2. A drive chain comprising links, each of which includes opposite side members the adjacent ends of the side members of adjacent links being in overlapped relation with respect to each other and the said side members of each of the said links having elongated openings extending transversely therethrough, pintles for hingedly connecting the adjacent overlapping ends of the side members of the said links, the said pintles each comprising a central portion which is oblong in cross section, the said portion extending transversely of the said openings, and the said central portion having pivot portions projecting outwardly therefrom, the said pivot portions extending through the openings of the overlapping ends of adjacent links, and elongated heads integral with the outer ends of said pivot portions, the said heads being seated in notches upon the outer sides of the overlapping ends of the side members of a link for retaining the side members of adjacent links upon said pintle.

In testimony that I claim the foregoing as my invention, I have hereunto signed my name this 19th day of December, A. D., 1921.

CHARLES FREDERICK MEIER.